US012601966B2

(12) United States Patent
Hsu et al.

(10) Patent No.: US 12,601,966 B2
(45) Date of Patent: Apr. 14, 2026

(54) WAVELENGTH CONVERSION MODULE AND PROJECTOR

(71) Applicant: Coretronic Corporation, Hsin-Chu (TW)

(72) Inventors: Pi-Tsung Hsu, Hsin-Chu (TW); Chi-Tang Hsieh, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/549,885

(22) Filed: Dec. 14, 2021

(65) Prior Publication Data

US 2022/0206373 A1      Jun. 30, 2022

(30) Foreign Application Priority Data

Dec. 24, 2020      (CN) .......................... 202011548218.2

(51) Int. Cl.
  *G03B 21/20*      (2006.01)
  *G02B 26/00*      (2006.01)
(52) U.S. Cl.
  CPC ......... *G03B 21/204* (2013.01); *G02B 26/008* (2013.01)
(58) Field of Classification Search
  CPC ............ G03B 21/00–64; G03B 21/204; G02B 26/008; H04N 9/31–3197
  See application file for complete search history.

(56) References Cited

U.S. PATENT DOCUMENTS

| | | | |
|---|---|---|---|
| 2015/0229892 A1 | 8/2015 | Dai et al. | |
| 2016/0077325 A1 | 3/2016 | Tsai et al. | |
| 2016/0238922 A1 | 8/2016 | Furuyama et al. | |
| 2017/0269461 A1* | 9/2017 | Ikeda ................... | G02B 26/008 |
| 2017/0293211 A1* | 10/2017 | Kobayashi ............. | G03B 21/16 |
| 2018/0031207 A1 | 2/2018 | Chang et al. | |
| 2019/0137858 A1* | 5/2019 | Hsieh ................. | G03B 21/2066 |
| 2021/0286166 A1* | 9/2021 | Ni ......................... | G03B 21/204 |

FOREIGN PATENT DOCUMENTS

| | | |
|---|---|---|
| CN | 2411572 | 12/2000 |
| CN | 101114621 | 1/2008 |
| CN | 201700114 | 1/2011 |
| CN | 102238843 | 11/2011 |
| CN | 103087527 | 5/2013 |

(Continued)

OTHER PUBLICATIONS

"Office Action of China Counterpart Application", issued on Jan. 12, 2023, p. 1-p. 13.

*Primary Examiner* — Christopher A Lamb, II
(74) *Attorney, Agent, or Firm* — JCIPRNET

(57) ABSTRACT

A wavelength conversion module, including a substrate, a wavelength conversion layer, and multiple adhesive bosses, is provided. The substrate has a first surface. The wavelength conversion layer is configured on the first surface of the substrate. The adhesive bosses are separately configured on the first surface of the substrate. The wavelength conversion layer surrounds the adhesive bosses, and each of the adhesive bosses is configured separately from the wavelength conversion layer. The disclosure also provides a projector including the wavelength conversion module. The wavelength conversion module has better heat dissipation effect.

9 Claims, 12 Drawing Sheets

(56)          References Cited

FOREIGN PATENT DOCUMENTS

| | | | |
|---|---|---|---|
| CN | 104393145 | 3/2015 | |
| CN | 106199947 | 12/2016 | |
| CN | 106610557 | 5/2017 | |
| CN | 206451697 | 8/2017 | |
| CN | 107272186 | 10/2017 | |
| CN | 208903064 | 5/2019 | |
| CN | 209525553 | 10/2019 | |
| CN | 209624966 | 11/2019 | |
| CN | 209624966 U * | 11/2019 | ........... G03B 21/204 |
| CN | 111253749 | 6/2020 | |
| CN | 111269575 | 6/2020 | |
| CN | 111505893 | 8/2020 | |
| CN | 111812928 | 10/2020 | |
| JP | 2009009991 | 1/2009 | |
| TW | 201610549 | 3/2016 | |

* cited by examiner

100a

WAVELENGTH CONVERSION MODULE AND PROJECTOR

CROSS-REFERENCE TO RELATED APPLICATION

This application claims the priority benefit of China application serial no. 202011548218.2, filed on Dec. 24, 2020. The entirety of the above-mentioned patent application is hereby incorporated by reference herein and made a part of this specification.

BACKGROUND

Technical Field

The disclosure relates to an optical module and a projector, and particularly relates to a wavelength conversion module and a projector having the wavelength conversion module.

Description of Related Art

Most existing phosphor wheels use aluminum or aluminum alloy metal substrate as the heat dissipation substrate, and the appearance design of the heat dissipation substrate is mostly a flat circular or ring structure without any special structure on the surface. In order to increase the efficiency of heat dissipation, at present, the surface area may also be increased by forming bosses or grooves on the front surface, the back surface, or both the front and back surfaces of the heat dissipation substrate through stamping or processing forming, but the height/depth and the number of structures will also be reduce the strength of the substrate. The boss structures will generate turbulence or increase convection during the high-speed rotational process of the phosphor wheel, and accelerate the removal of heat around the phosphor wheel through the turbulence or convection, so as to reduce the temperature of the fluorescent layer of the phosphor wheel, thereby increasing the excitation efficiency of the phosphor wheel.

However, if the phosphor wheel uses high-temperature inorganic glue to sinter phosphor powder or diffuse reflective particles onto the heat dissipation substrate, the sintering temperature needs to be greater than 700° C., but the metal heat dissipation substrate is unable to withstand such temperature, thereby causing failed full bonding with the phosphor layer or the diffuse reflective layer after sintering. Therefore, in order to increase the sintering temperature of the phosphor wheel and reduce the limitation on the material used for the fluorescent layer and the reflective layer, a ceramic substrate with high thermal conductivity is also currently used as the heat dissipation substrate. Although the temperature resistance of the ceramic substrate may be greater than 600° C., it is difficult for the boss structure to be formed on the surface of the ceramic substrate, which causes the heat dissipation effect of using the ceramic substrate to be poor, thereby affecting the excitation efficiency of the phosphor wheel. In addition, the ceramic substrate is a brittle material, which is susceptible to issues such as cracking during the operational process due to hidden cracks generated during the forming and processing of the substrate, thereby affecting the reliability of the phosphor wheel.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a wavelength conversion module, which has a better heat dissipation effect on a wavelength conversion layer.

The disclosure also provides a projector, which includes the wavelength conversion module and has better projection quality and product competitiveness.

The other objectives and advantages of the disclosure may be further understood from the technical features disclosed in the disclosure.

In order to achieve one, part of, or all of the above objectives or other objectives, an embodiment of the disclosure provides a wavelength conversion module, which includes a substrate, a wavelength conversion layer, and multiple adhesive bosses. The substrate has a first surface. The wavelength conversion layer is configured on the first surface of the substrate. The adhesive bosses are separately configured on the first surface of the substrate. The wavelength conversion layer surrounds the adhesive bosses, and each of the multiple adhesive bosses is configured separately from the wavelength conversion layer.

In order to achieve one, part of, or all of the above objectives or other objectives, an embodiment of the disclosure provides a projector, which includes an illumination module, a light valve, and a projection lens. The illumination module is configured to provide an illumination beam. The illumination module includes a light source and a wavelength conversion module. The light source is configured to provide an excitation beam. The wavelength conversion module is configured on a transmission path of the excitation beam and is configured to convert the excitation beam into a conversion beam. The illumination beam includes the conversion beam. The wavelength conversion module includes a substrate, a wavelength conversion layer, and multiple adhesive bosses. The substrate has a first surface. The wavelength conversion layer is configured on the first surface of the substrate. The adhesive bosses are separately configured on the first surface of the substrate. The wavelength conversion layer surrounds the adhesive bosses, and each of the multiple adhesive bosses is configured separately from the wavelength conversion layer. The light valve is configured on a transmission path of the illumination beam and is configured to convert the illumination beam into an image beam. The projection lens is configured on a transmission path of the image beam and is configured to project the image beam out of the projector.

Based on the above, the embodiments of the disclosure have at least one of the following advantages or effects. In the design of the wavelength conversion module of the disclosure, the adhesive bosses are separately configured on the substrate, and the adhesive bosses are configured separately from the wavelength conversion layer, so that the adhesive bosses are configured without contacting the inner side of the wavelength conversion layer. With the design of the adhesive bosses, the heat dissipation effect of the substrate may be increased when the wavelength conversion module rotates at a high speed to reduce the temperature of the wavelength conversion layer, thereby increasing the excitation efficiency of the wavelength conversion module. Furthermore, the adhesive bosses also have the functions of increasing the toughness and strength of the substrate while balancing weight. In addition, the projector adopting the wavelength conversion module of the disclosure may have better projection quality and product competitiveness.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
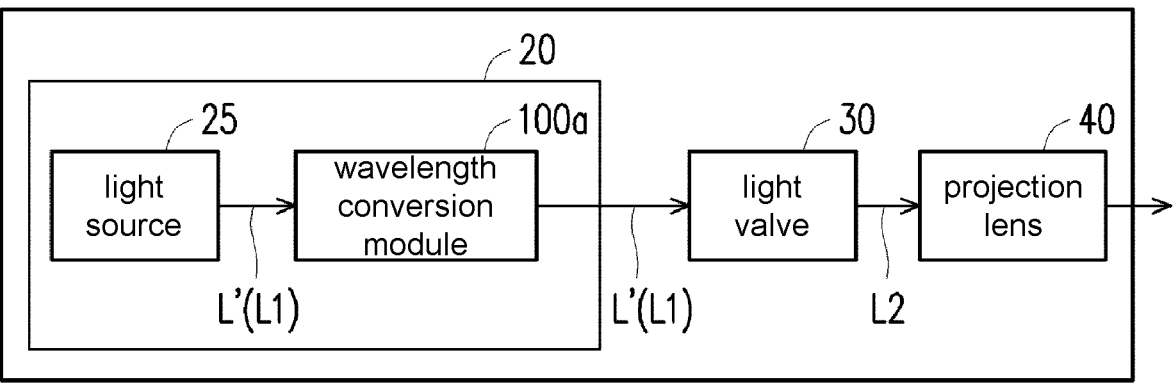
FIG. 1 is a schematic diagram of a projector according to an embodiment of the disclosure.

FIG. 1 is a schematic diagram of a projector according to an embodiment of the disclosure. Please refer to FIG. 1. In this embodiment, a projector 10 includes an illumination module 20, a light valve 30, and a projection lens 40. The illumination module 20 is configured to provide an illumination beam L1. The illumination module 20 includes a light source 25 and a wavelength conversion module 100*a*. The light source 25 is configured to provide an excitation beam L'. The wavelength conversion module 100*a* is configured on a transmission path of the excitation beam L' and is configured to convert the excitation beam L' into a conversion beam. Here, the illumination beam L1 includes the excitation beam L' and the conversion beam. To further illustrate, the excitation beam L' and the conversion beam leave the illumination module 20 in time sequence to form the illumination beam L1. The light valve 30 is configured on a transmission path of the illumination beam L1 and is configured to convert the illumination beam L1 into an image beam L2. The projection lens 40 is disposed on a transmission path of the image beam L2 and is configured to project the image beam L2 out of the projector 10.

In detail, the light source 25 used in this embodiment is, for example, a laser diode (LD), such as an LD bank. Specifically, any light source that meets the volume requirement in actual design may be implemented, and the disclosure is not limited thereto. The light valve 30 is, for example, a reflective optical modulator such as a liquid crystal on silicon panel (LCoS panel) and a digital micro-mirror device (DMD). In an embodiment, the light valve 30 is, for example, a transmissive optical modulator such as a transparent liquid crystal panel, an electro-optical modulator, a magneto-optical modulator, and an acousto-optical modulator, but this embodiment does not limit the form and type of the light valve 30. The detailed steps and implementation manner of the method of the light valve 30 transforming the illumination beam L1 into the image beam L2 may be obtained from common knowledge in the art with sufficient teaching, suggestion, and implementation description, so there will be no reiteration.

In addition, the projection lens 40 includes, for example, a combination of one or more optical lenses with refractive power, such as various combinations of non-planar lenses such as biconcave lens elements, biconvex lens elements, concave-convex lens elements, convex-concave lens elements, plano-convex lens elements, and plano-concave lens elements. In an embodiment, the projection lens 40 may also include a flat optical lens to convert the image beam L2 from the light valve 30 into a projection beam to be projected out of the projector 10 in a reflective or transmissive manner. Here, this embodiment does not limit the form and type of the projection lens 40.

Figure 2A:
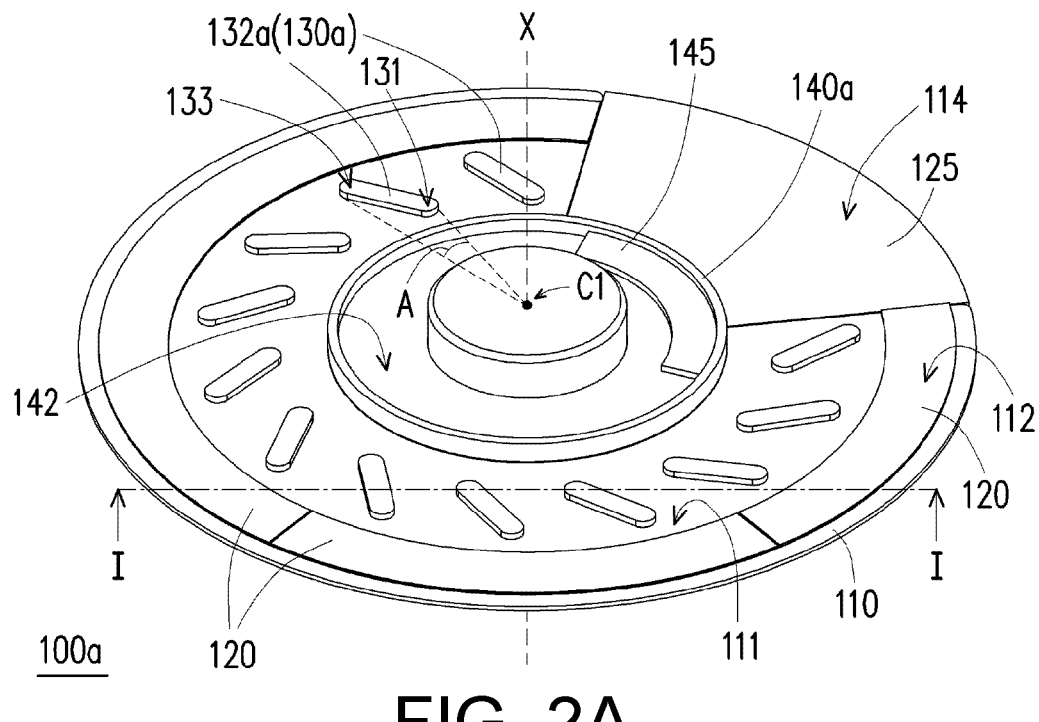
FIG. 2A is a perspective schematic diagram of a wavelength conversion module according to an embodiment of the disclosure.
Figure 2B:
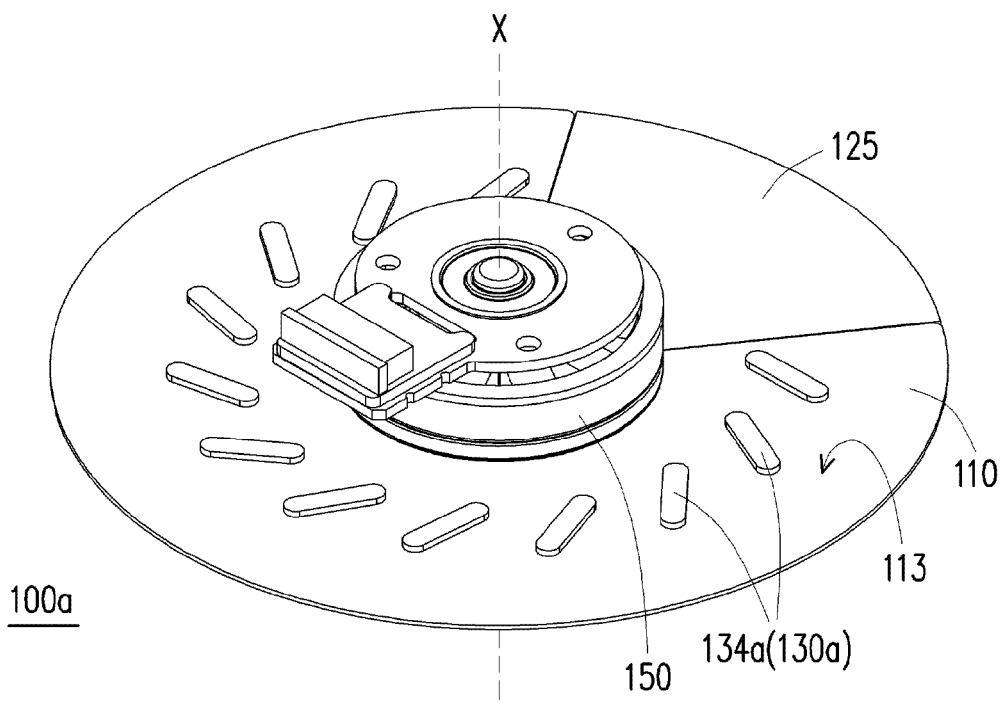
FIG. 2B is a perspective schematic diagram of the wavelength conversion module of FIG. 2A from another viewing angle.
Figure 2C:
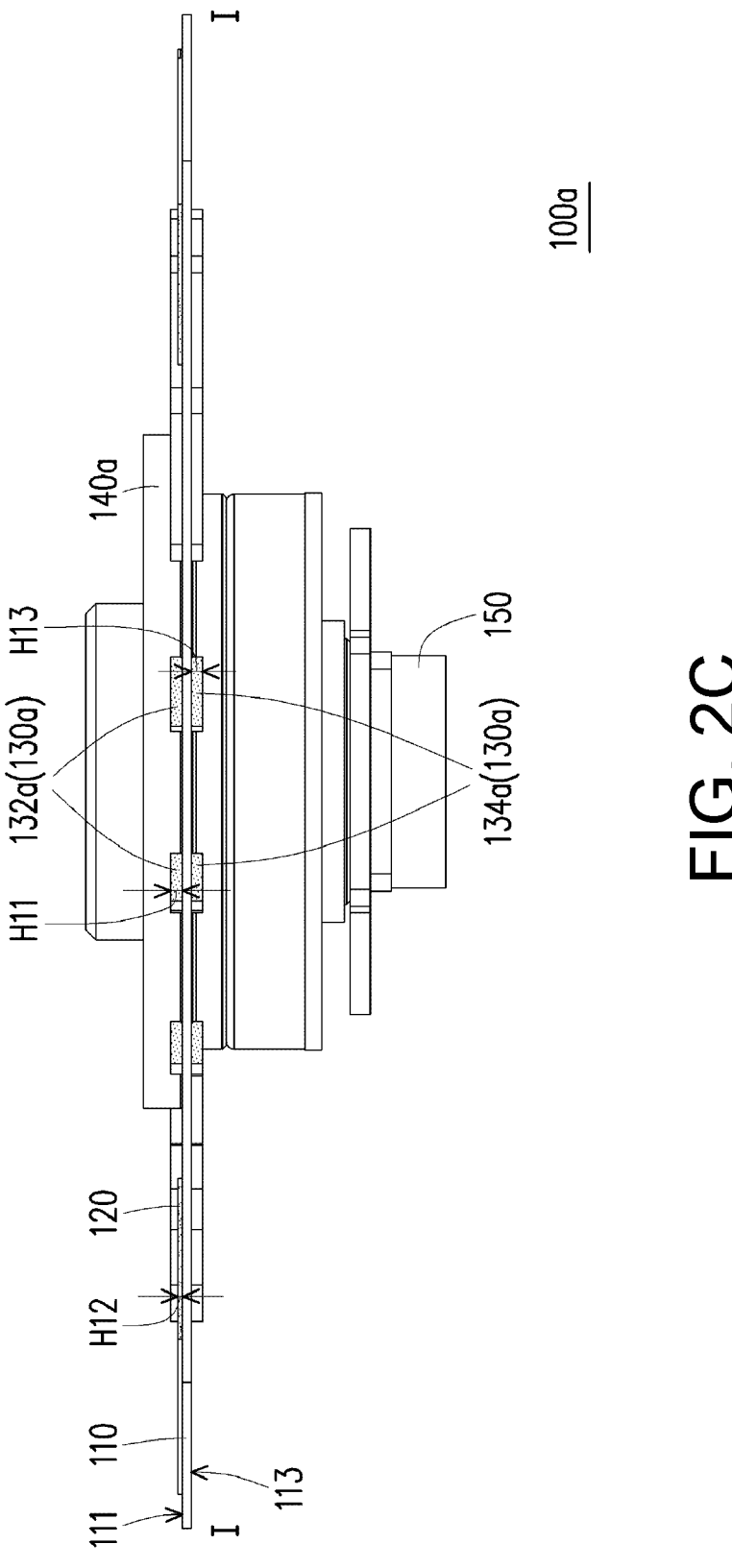
FIG. 2C is a schematic diagram of a cross section taken along a line I-I of FIG. 2A.

FIG. 2A is a perspective schematic diagram of a wavelength conversion module according to an embodiment of the disclosure. FIG. 2B is a perspective schematic diagram of the wavelength conversion module of FIG. 2A from another viewing angle. FIG. 2C is a schematic diagram of a cross section taken along a line I-I of FIG. 2A. Please refer to FIG. 2A and FIG. 2B at the same time. In this embodiment, a wavelength conversion module 100a includes a substrate 110, a wavelength conversion layer 120, and multiple adhesive bosses 130a. The substrate 110 has a first surface 111 and a second surface 113 opposite to each other. The wavelength conversion layer 120 is configured on the first surface 111 of the substrate 110. The wavelength conversion layer 120 is, for example, a phosphor powder layer, such as a phosphor powder layer that generates a yellow and green conversion light after excitation, but not limited thereto, and is configured to convert the wavelength of the excitation beam L' of FIG. 1 and respectively generate conversion beams with different wavelengths. The adhesive bosses 130a include multiple first adhesive bosses 132a and multiple second adhesive bosses 134a. The first adhesive bosses 132a are separately configured on the first surface 111, and the second adhesive bosses 134a are separately configured on the second surface 113. The wavelength conversion layer 120 surrounds the adhesive bosses 130a, and the adhesive bosses 130a are configured without contacting the inner side of the wavelength conversion layer 120. That is, each adhesive boss 130a is configured separately from the wavelength conversion layer 120, so that there is a distance between the adhesive boss 130a and the wavelength conversion layer 120.

More specifically, the substrate 110 of this embodiment has a wavelength conversion region 112 and an optical region 114 adjacently configured along the circumferential direction. The wavelength conversion layer 120 is located in the wavelength conversion region 112. The optical region 114 is configured with a transparent plate 125 or a reflective structure (not shown). That is, the wavelength conversion module 100a of this embodiment may be a transmissive wavelength conversion module or a reflective wavelength conversion module. In this embodiment, the transmissive wavelength conversion module is taken as an example. The optical region 114 is provided with the transparent plate 125, so that the excitation beam L' (please refer to FIG. 1) transmitted to the optical region 114 penetrates the transparent plate 125 to be then transmitted to other optical elements. In another embodiment not shown, the reflective wavelength conversion module may be used. In this case, the optical region 114 may be provided with a reflective structure, so that the excitation beam L' transmitted to the optical region 114 (please refer to FIG. 1) is reflected by the reflective structure to be then transmitted to other optical elements. The disclosure does not limit whether the wavelength conversion module 100a is transmissive or reflective. Here, the material of the substrate 110 is, for example, aluminum, aluminum oxide, aluminum nitride, silicon carbide, ceramic, ceramic and metal composite material, plastic and ceramic composite material, or plastic and metal composite material.

Furthermore, the shape of the adhesive boss 130a of this embodiment is, for example, a bar shape or a block shape. The shape of the adhesive boss 130a of this embodiment is exemplified as a bar shape for illustration. Each adhesive boss 130a has a first end 131 and a second end 133 opposite to each other. The connecting line between the first end 131 and an axis center C1 and the connecting line between the second end 133 and the axis center C1 form an included angle A, which means that the adhesive bosses 130a are not arranged along the radial direction of the substrate 110. Here, the material of the adhesive bosses 130a is, for example, metal glue, acrylic glue, silica gel, epoxy glue, or inorganic glue. The adhesive bosses 130a are formed on the substrate 110 by means of dispensing, printing, spraying, exposure and development, etc. In this embodiment, an adhesive with better thermal conductivity is selected as the material of the adhesive bosses 130a. The adhesive bosses 130a may not only spoil the flow, but also increase the effective heat dissipation area. Preferably, the adhesive may be metal glue. The thermal conductivity of each adhesive boss 130a is greater than 10 W/m·K. In addition, the coated adhesive also needs to withstand up to 100° C. without degradation, and preferably, withstand up to 200° C. or more, which may avoid degradation caused by heat energy generated during the wavelength conversion process.

Next, please refer to FIG. 2C. In this embodiment, there is a first height difference H11 between each first adhesive boss 132a and the first surface 111 of the substrate 110. There is a second height difference H12 between the wavelength conversion layer 120 and the first surface 111 of the substrate 110. There is a third height difference H13 between each second adhesive boss 134a and the second surface 113 of the substrate 110. Preferably, the first height difference H11 is equal to the third height difference H13, and the first height difference H11 is greater than the second height difference H12. Here, the first height difference H11 is, for example, greater than 0.3 mm and less than 0.8 mm.

In addition, please refer to FIG. 2A and FIG. 2B at the same time. The wavelength conversion module 100a of this embodiment further includes a weight ring 140a and a driving component 150. The driving component 150 is connected to the substrate 110 to drive the substrate 110 to rotate with an axis X of the driving component 150 as the axis center. The driving component 150 and the second adhesive bosses 134a are configured on the second surface 113, and the second adhesive bosses 134a surround the driving component 150. The weight ring 140a is attached onto the substrate 110 along the axis X. The weight ring 140a is configured on the first surface 111 of the substrate 110. The substrate 110 is located between the weight ring 140a and the driving component 150. The first adhesive bosses 132a are located between the weight ring 140a and the wavelength conversion layer 120, and the first adhesive bosses 132a surround the weight ring 140a. In addition, as shown in FIG. 2A, the wavelength conversion module 100a further includes a filler 145, which is configured in a recess 142 of the weight ring 140a to balance and correct the wavelength conversion module 100a.

In short, the adhesive bosses 130a are separately configured on the substrate 110, and the adhesive bosses 130a are configured without contacting the inner side of the wavelength conversion layer 120. In this way, the design of the adhesive bosses 130a may increase the heat dissipation effect of the substrate 110 when the wavelength conversion module 100a rotates at a high speed to reduce the temperature of the wavelength conversion layer 120, thereby increasing the excitation efficiency of the wavelength conversion module 100a. Preferably, the heat dissipation efficiency of the wavelength conversion module 100a may be increased by 20% to 30%, the excitation efficiency of the wavelength conversion module 100a may be increased by 5% to 10%, and the temperature may be reduced by 10° C. to 20° C. Furthermore, the adhesive bosses 130a also have the functions of increasing the toughness and strength of the substrate 110 while balancing weight. In addition, the projector 10 adopting the wavelength conversion module 100a of this embodiment has better heat dissipation and wavelength conversion efficiency, so as to have better projection quality and product competitiveness.

It must be noted here that the following embodiments continue to use the reference numerals of the elements and part of the content of the foregoing embodiment. The same reference numerals are used to represent the same or similar elements, and the description of the same technical content is omitted. Reference may be made to the foregoing embodiment for the description of the omitted parts, which will not be reiterated in the following embodiments.

Figure 3A:
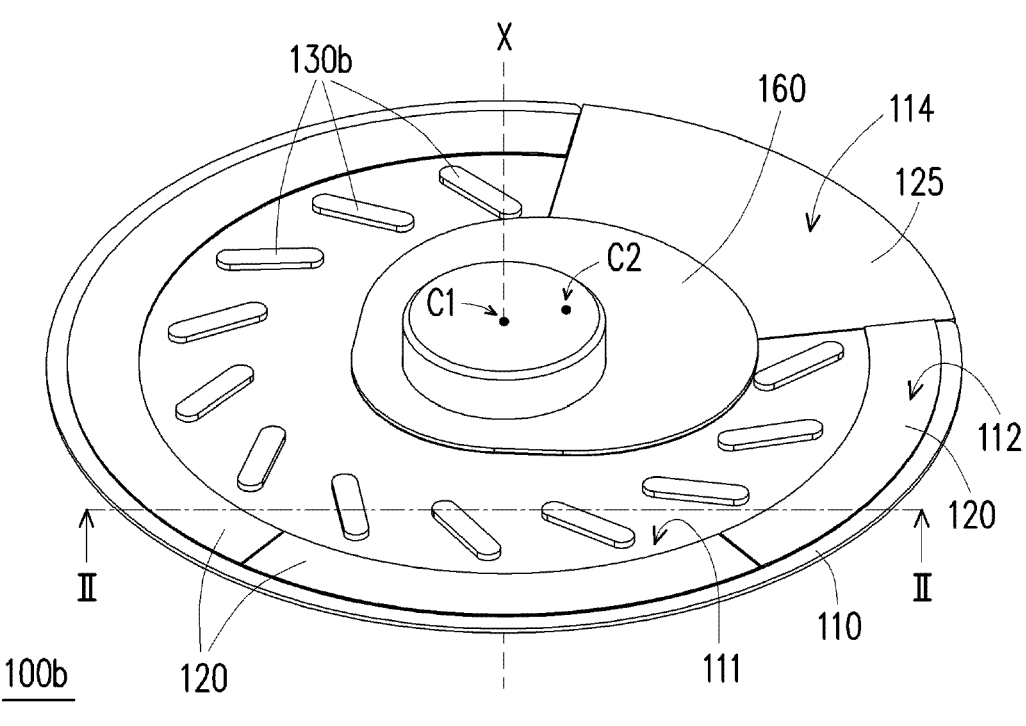
FIG. 3A is a perspective schematic diagram of a wavelength conversion module according to another embodiment of the disclosure.
Figure 3B:
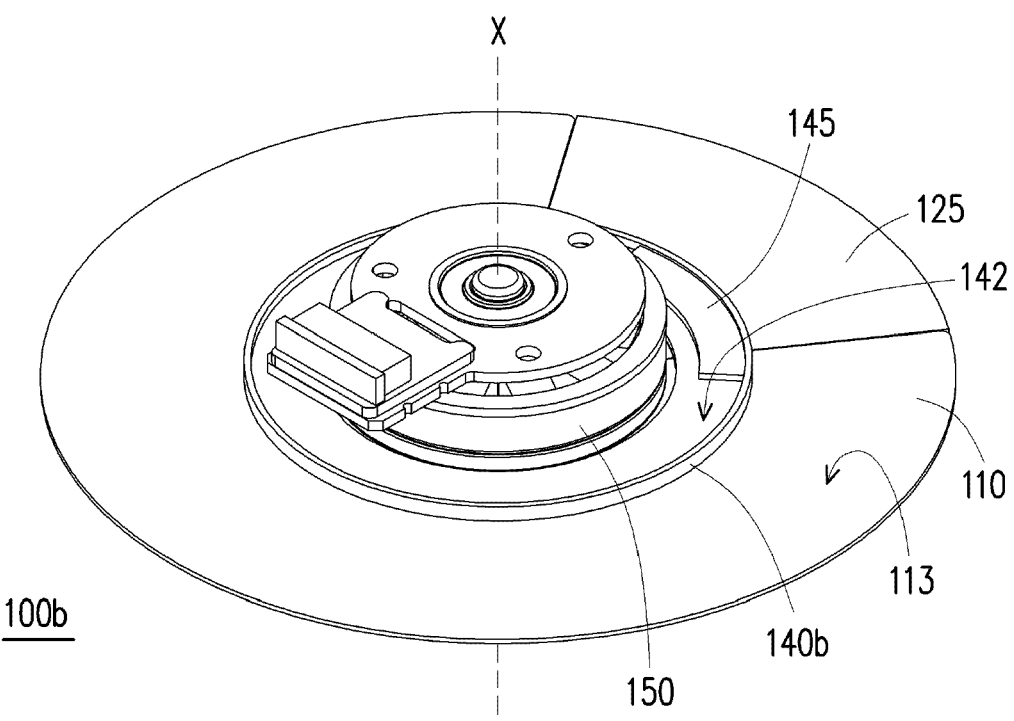
FIG. 3B is a perspective schematic diagram of the wavelength conversion module of FIG. 3A from another viewing angle.
Figure 3C:
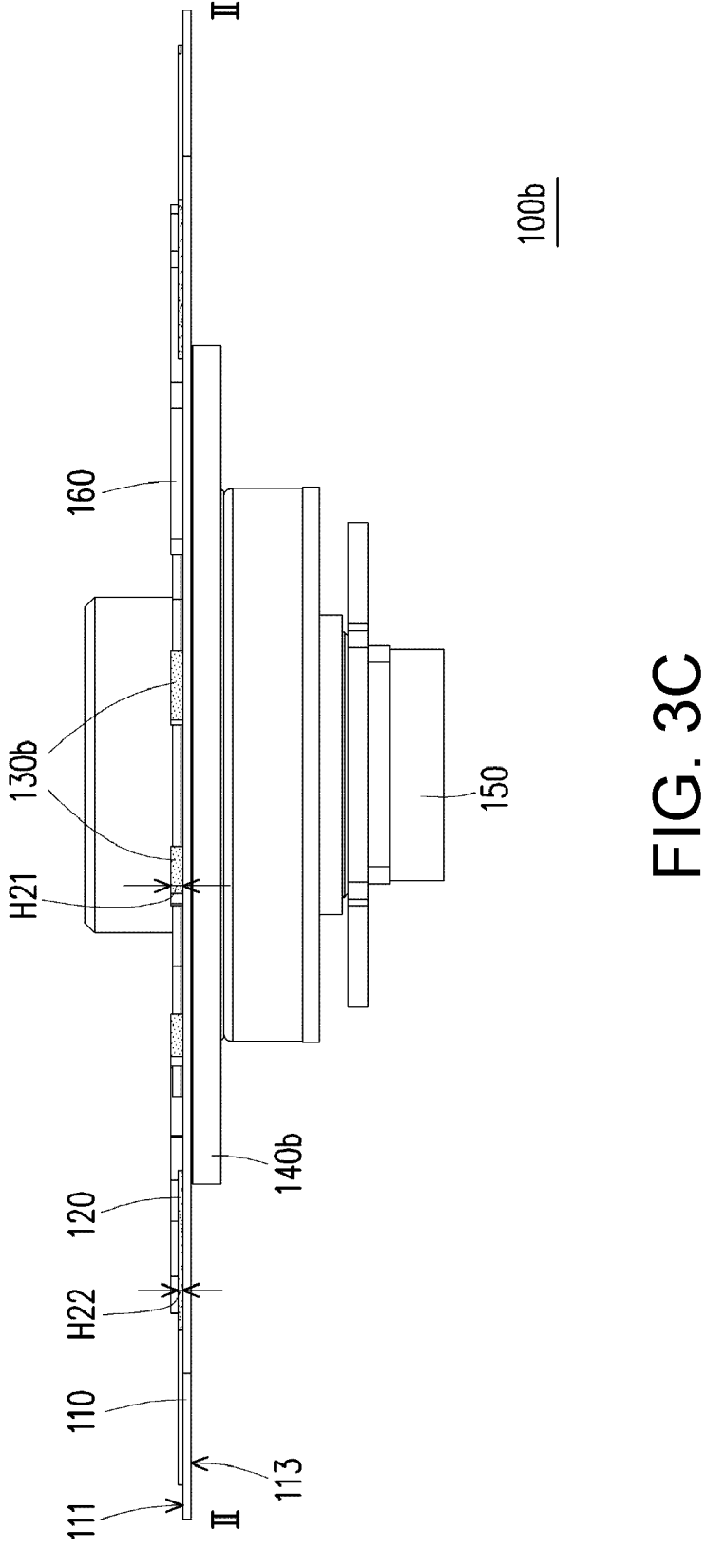
FIG. 3C is a schematic diagram of a cross section taken along a line II-II of FIG. 3A.

FIG. 3A is a perspective schematic diagram of a wavelength conversion module according to another embodiment of the disclosure. FIG. 3B is a perspective schematic diagram of the wavelength conversion module of FIG. 3A from another viewing angle. FIG. 3C is a schematic diagram of a cross section taken along a line II-II of FIG. 3A. Please refer to FIG. 2A, FIG. 2B, FIG. 3A, and FIG. 3B at the same time. A wavelength conversion module 100b of this embodiment is similar to the wavelength conversion module 100a of FIG. 2A and FIG. 2B. The difference between the two is: in this embodiment, adhesive bosses 130b are only located on the first surface 111 of the substrate 110, a weight ring 140b is configured on the second surface 113 of the substrate 110, and the filler 145 is configured in the recess 142 of the weight ring 140b to balance and correct the wavelength conversion module 100b.

Furthermore, the wavelength conversion module 100b of this embodiment further includes an eccentric cover slab 160, which is configured on the first surface 111 of the substrate 110. A center of mass C2 of the eccentric cover slab 160 deviates from the axis center C1. The first adhesive bosses 132a surround the eccentric cover slab 160. Here, the weight ring 140b is located between the driving component 150 and the substrate 110. The adhesive bosses 130b are located between the eccentric cover slab 160 and the wavelength conversion layer 120. Afterwards, please refer to FIG. 3C. In this embodiment, there is a first height difference H21 between each adhesive boss 130b and the first surface 111 of the substrate 110. There is a second height difference H22 between the wavelength conversion layer 120 and the first surface 111 of the substrate 110. Preferably, the first height difference H21 is greater than the second height difference H22. The first height difference H21 is, for example, greater than 0.3 mm and less than 0.8 mm.

Figure 4A:
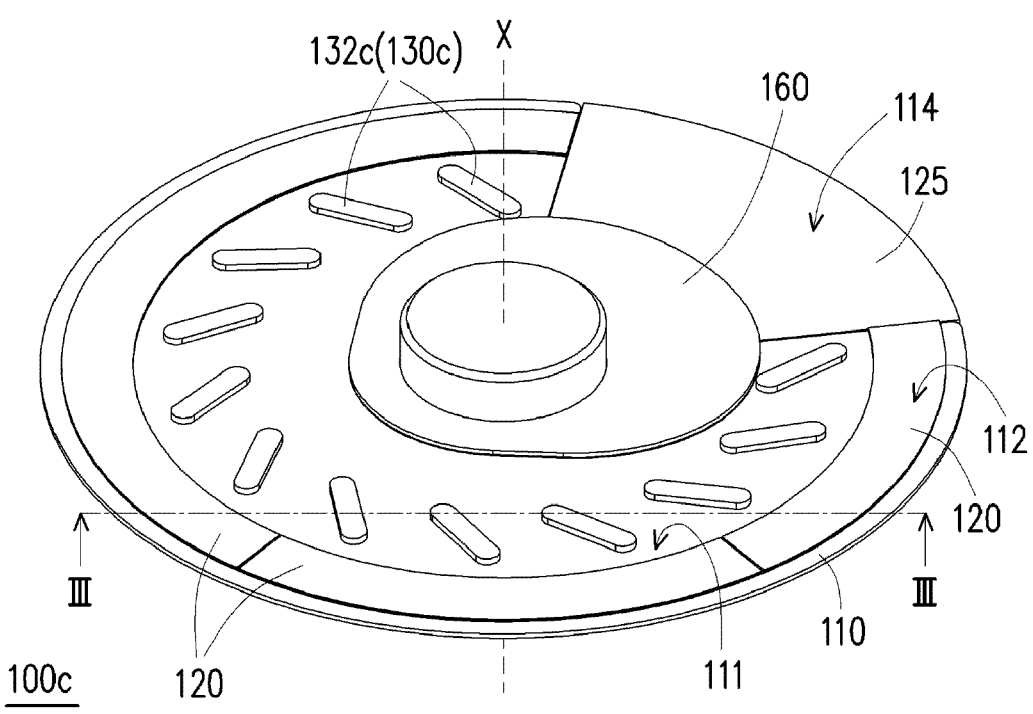
FIG. 4A is a perspective schematic diagram of a wavelength conversion module according to another embodiment of the disclosure.
Figure 4B:
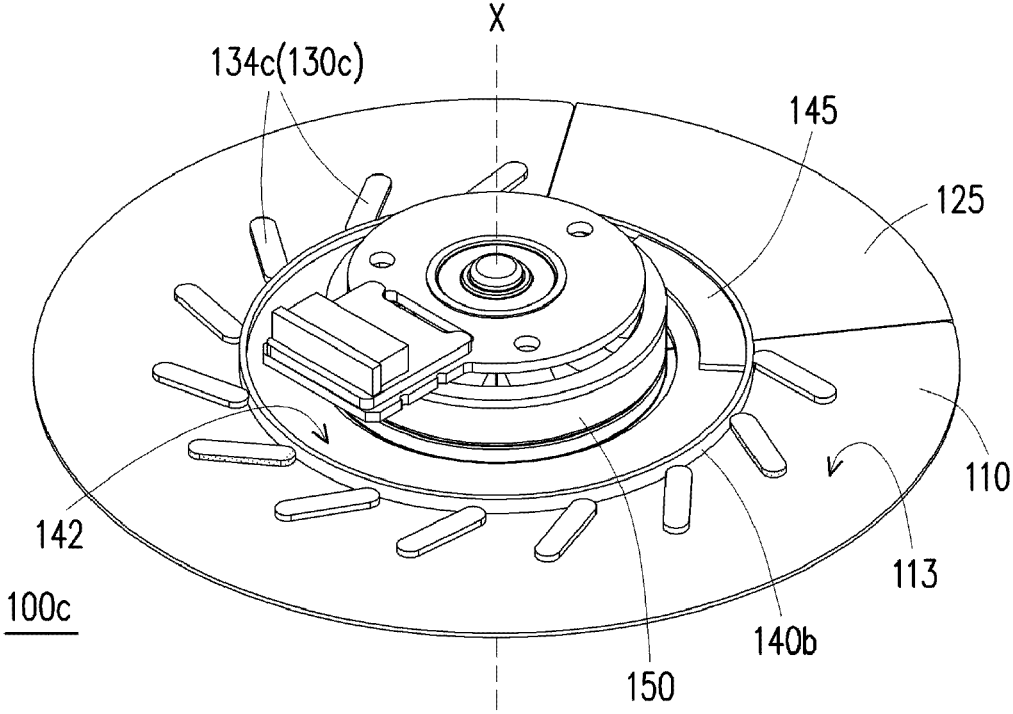
FIG. 4B is a perspective schematic diagram of the wavelength conversion module of FIG. 4A from another viewing angle.
Figure 4C:
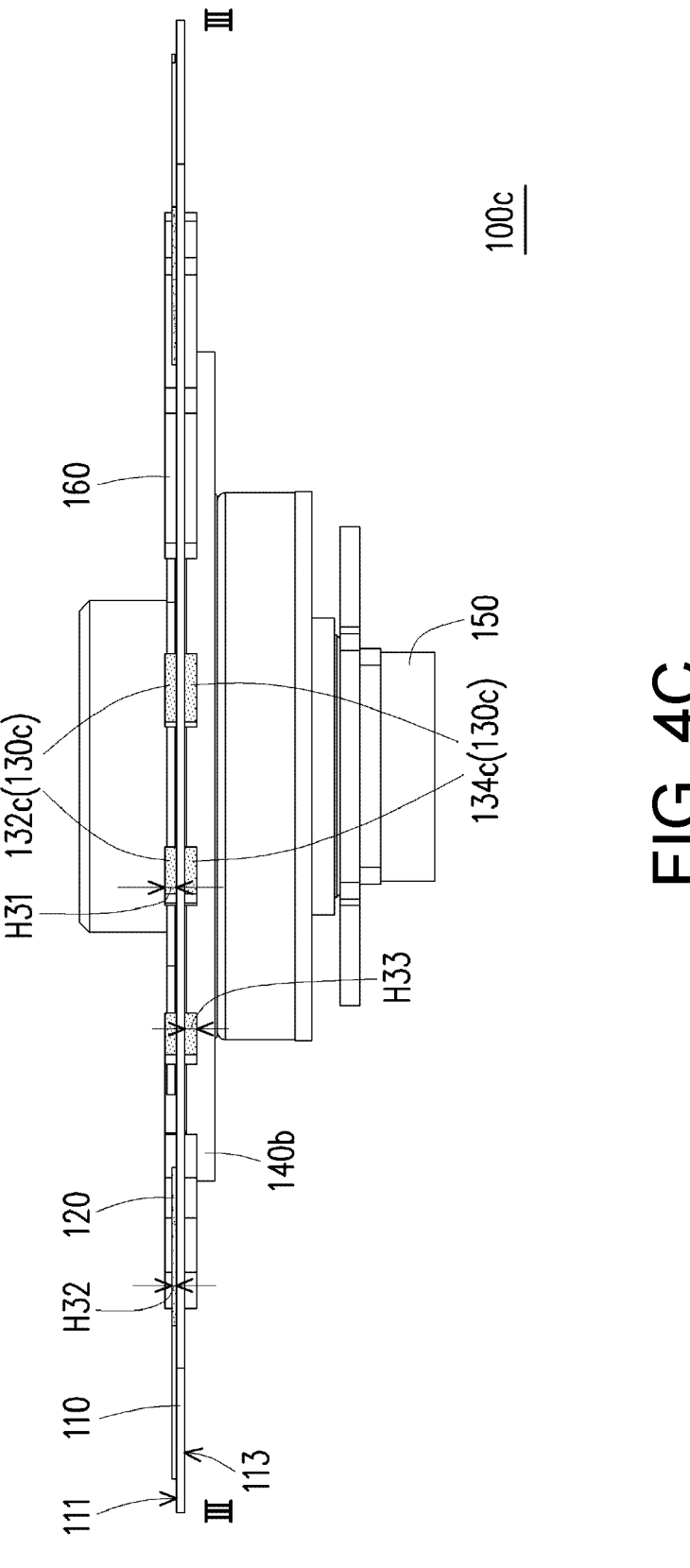
FIG. 4C is a schematic diagram of a cross section taken along a line III-III of FIG. 4A.

FIG. 4A is a perspective schematic diagram of a wavelength conversion module according to another embodiment of the disclosure. FIG. 4B is a perspective schematic diagram of the wavelength conversion module of FIG. 4A from another viewing angle. FIG. 4C is a schematic diagram of a cross section taken along a line III-III of FIG. 4A. A wavelength conversion module 100c of this embodiment is similar to the wavelength conversion module 100b of FIG. 3A and FIG. 3B. The difference between the two is: in this embodiment, adhesive bosses 130c of this embodiment includes multiple first adhesive bosses 132c and multiple second adhesive boss 134c. The first adhesive bosses 132c are configured on the first surface 111, and the second adhesive bosses 134c are configured on the second surface 113. Afterwards, please refer to FIG. 4C. In this embodiment, there is a first height difference H31 between each first adhesive boss 132c and the first surface 111 of the substrate 110. There is a second height difference H32 between the wavelength conversion layer 120 and the first surface 111 of the substrate 110. There is a third height difference H33 between each second adhesive boss 134c and the second surface 113 of the substrate 110. Preferably, the first height difference H31 is equal to the third height difference H33, and the first height difference H31 is greater than the second height difference H32. The first height difference H31 is, for example, greater than 0.3 mm and less than 0.8 mm.

Figure 5A:
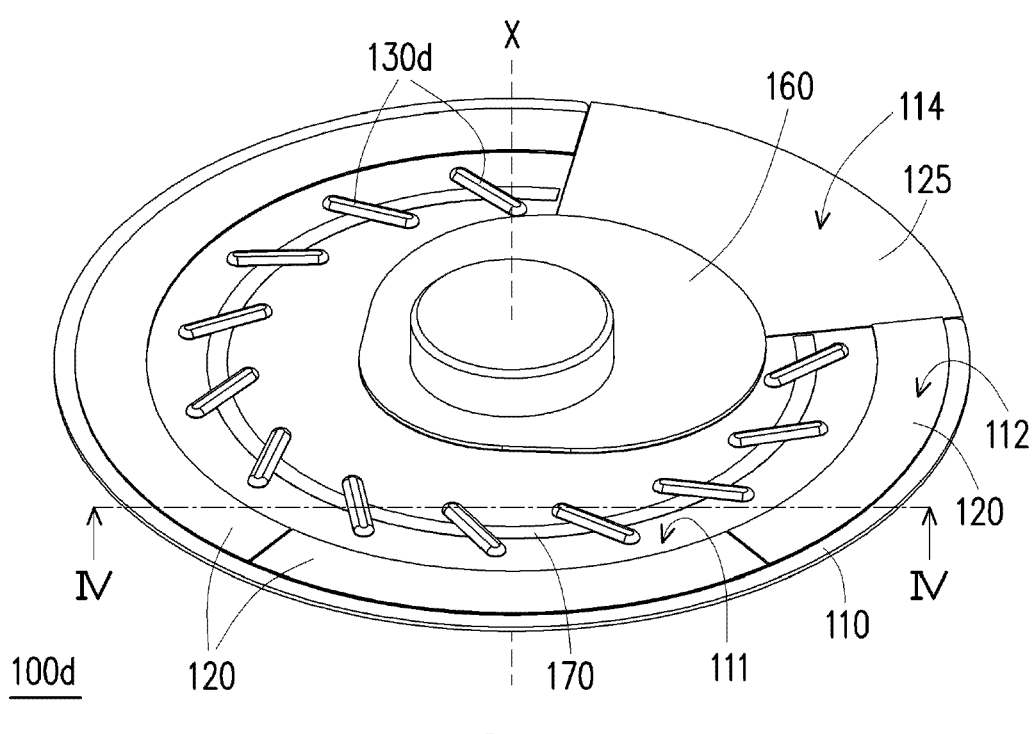
FIG. 5A is a perspective schematic diagram of a wavelength conversion module according to another embodiment of the disclosure.
Figure 5B:
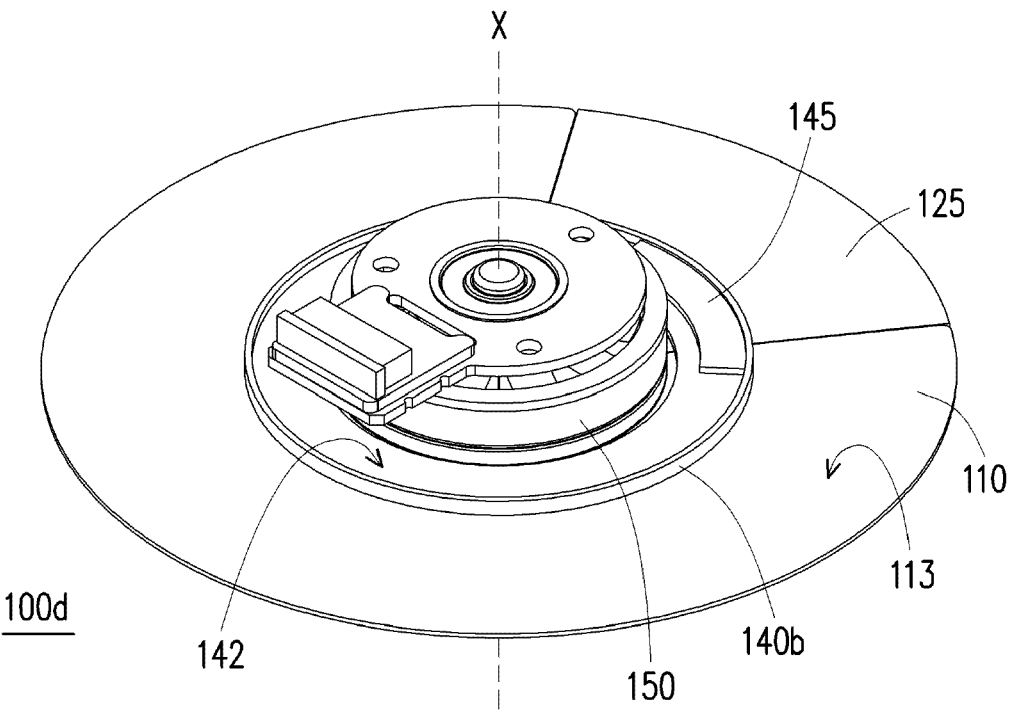
FIG. 5B is a perspective schematic diagram of the wavelength conversion module of FIG. 5A from another viewing angle.
Figure 5C:
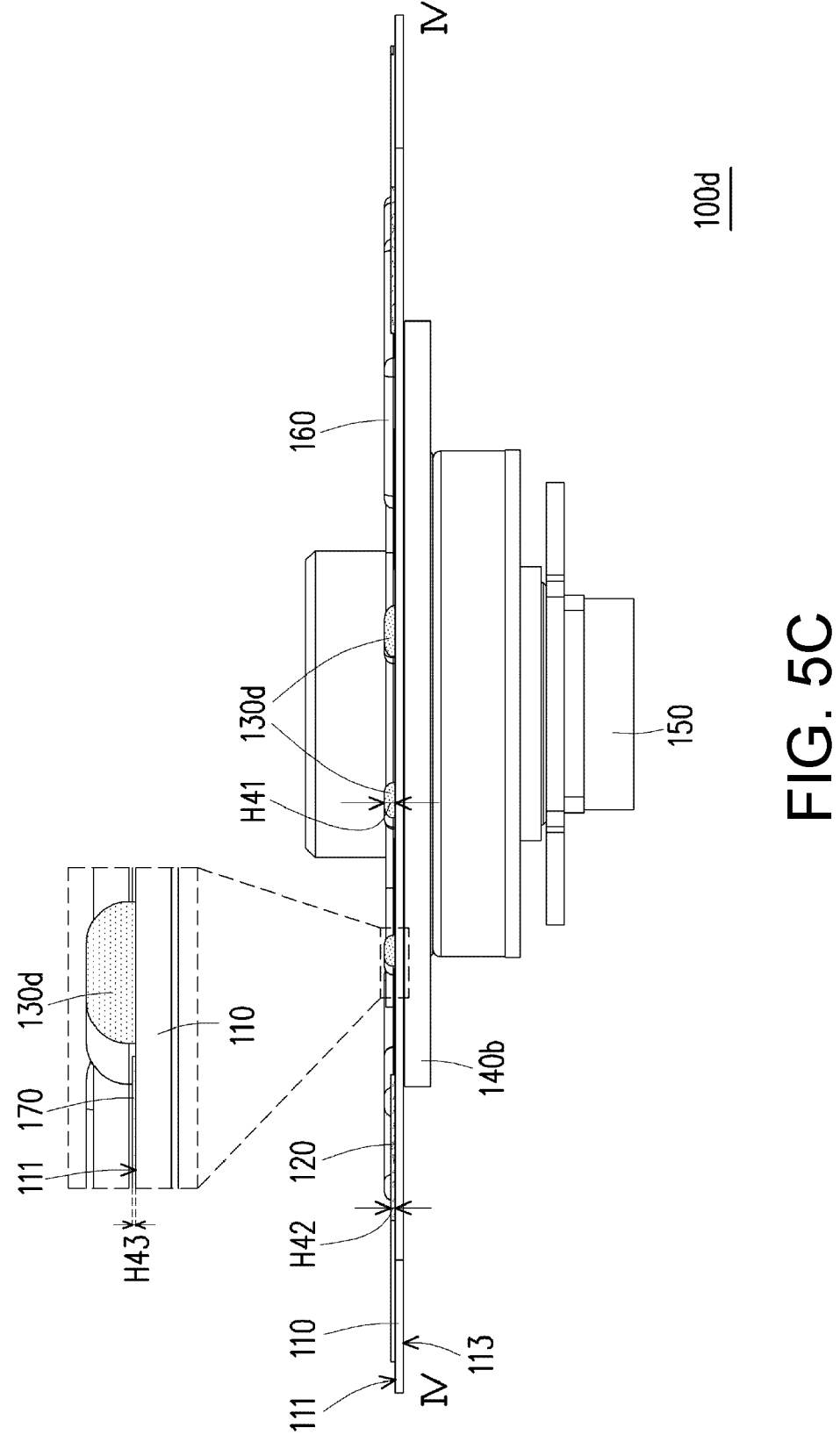
FIG. 5C is a schematic diagram of a cross section taken along a line IV-IV of FIG. 5A.

FIG. 5A is a perspective schematic diagram of a wavelength conversion module according to another embodiment of the disclosure. FIG. 5B is a perspective schematic diagram of the wavelength conversion module of FIG. 5A from another viewing angle. FIG. 5C is a schematic diagram of a cross section taken along a line IV-IV of FIG. 5A. A wavelength conversion module 100d of this embodiment is similar to the wavelength conversion module 100b of FIG. 3A and FIG. 3B. The difference between the two is: in this embodiment, the wavelength conversion module 100d further includes a connecting glue layer 170, which is connected to adhesive bosses 130d along the circumferential direction. That is, the adhesive bosses 130d are connected in series through the connecting glue layer 170, which may improve the adhesion between the connecting glue layer 170 and the substrate 110. Here, the material of the connecting glue layer 170 is, for example, metal glue, acrylic glue, silica gel, epoxy glue, or inorganic glue, but not limited thereto.

Then, please refer to FIG. 5C. In this embodiment, there is a first height difference H41 between each adhesive boss 130d and the first surface 111 of the substrate 110. There is a second height difference H42 between the wavelength conversion layer 120 and the first surface 111 of the substrate 110. There is a third height difference H43 between the connecting glue layer 170 and the first surface 111 of the substrate 110. Preferably, the first height difference H41 is greater than the second height difference H42 and the third height difference H43. The first height difference H41 is, for example, greater than 0.3 mm and less than 0.8 mm.

Figure 6A:
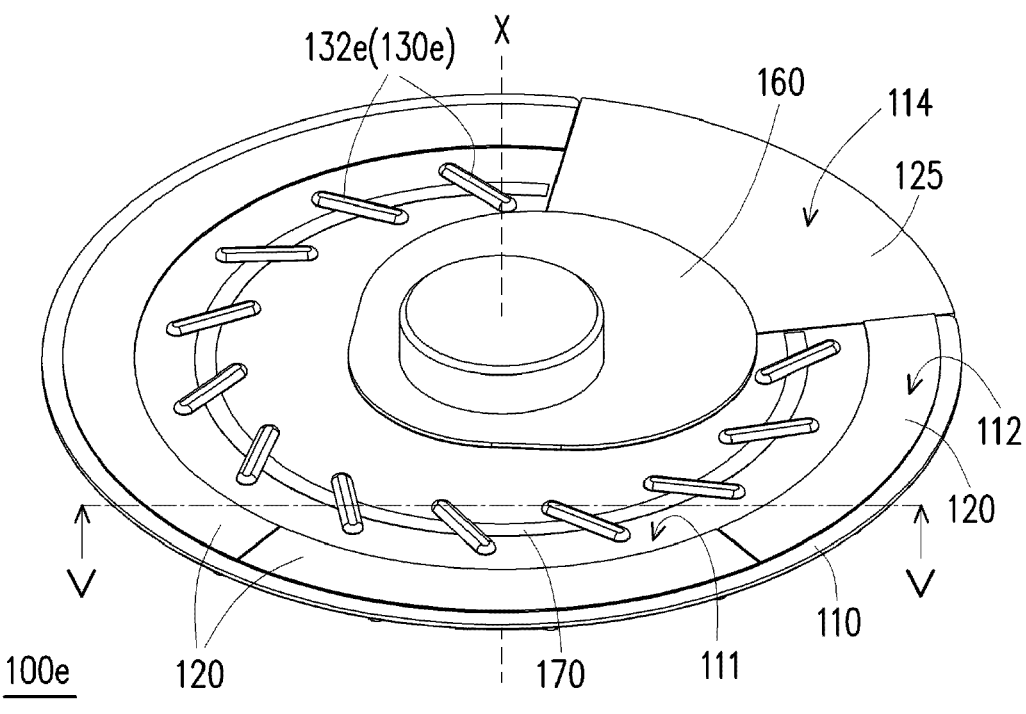
FIG. 6A is a perspective schematic diagram of a wavelength conversion module according to another embodiment of the disclosure.
Figure 6B:
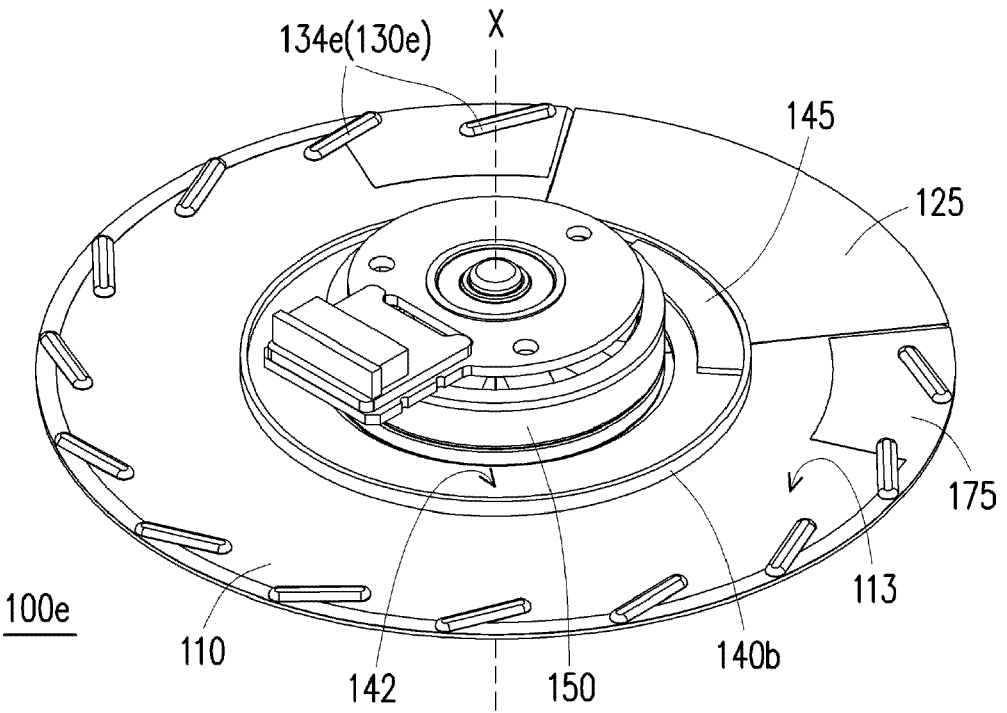
FIG. 6B is a perspective schematic diagram of the wavelength conversion module of FIG. 6A from another viewing angle.
Figure 6C:
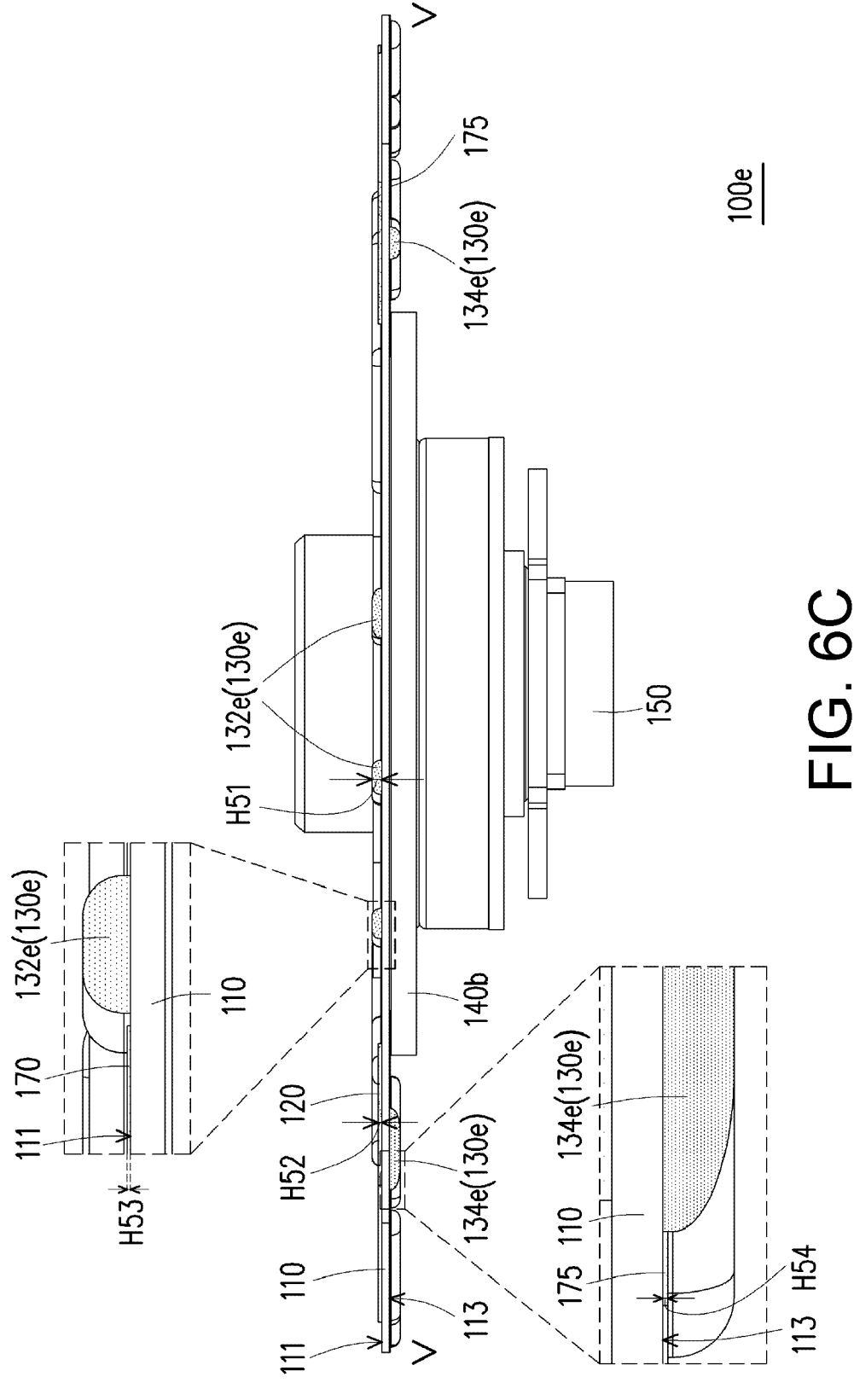
FIG. 6C is a schematic diagram of a cross section taken along a line V-V of FIG. 6A.

FIG. 6A is a perspective schematic diagram of a wavelength conversion module according to another embodiment of the disclosure. FIG. 6B is a perspective schematic diagram of the wavelength conversion module of FIG. 6A from another viewing angle. FIG. 6C is a schematic diagram of a cross section taken along a line V-V of FIG. 6A. A wavelength conversion module 100e of this embodiment is similar to the wavelength conversion module 100d of FIG. 5A and FIG. 5B. The difference between the two is: in this embodiment, adhesive bosses 130e include multiple first adhesive bosses 132e and multiple second adhesive bosses 134e. The first adhesive bosses 132e are configured on the first surface 111, and the second adhesive bosses 134e are configured on the second surface 113. Furthermore, the wavelength conversion module 100e of this embodiment further includes a connecting glue layer 175, which is configured on a part of the second surface 113 along the circumferential direction of the substrate 110. The second adhesive bosses 134e are connected to each other through the connecting glue layer 175. That is, the second adhesive bosses 134e are connected in series through the connecting glue layer 175, which may improve the adhesion between the connecting glue layer 175 and the substrate 110. Here, the material of the connecting glue layer 175 is, for example, metal glue, acrylic glue, silica gel, epoxy glue, or inorganic glue, but not limited thereto. In an embodiment, the connecting glue layer 175 may have different widths in the radial direction, and have a larger width at the position where the unbalance needs to be compensated, wherein the unbalance is caused when the center of gravity is shifted from the axis X, and the unbalance may be compensated by adjusting the position of center of gravity. For example, as shown in FIG. 6B, the two ends close to the transparent plate 125 have larger widths.

Please refer to FIG. 6C. In this embodiment, there is a first height difference H51 between each first adhesive boss 132e and the first surface 111 of the substrate 110. There is a second height difference H52 between the wavelength conversion layer 120 and the first surface 111 of the substrate 110. There is a third height difference H53 between the connecting glue layer 170 and the first surface 111 of the substrate 110. There is a fourth height difference H54 between the connecting glue layer 175 and the second surface 113 of the substrate 110. The first height difference H51 is greater than the second height difference H52, the third height difference H53, and the fourth height difference H54. The first height difference H51 is, for example, greater than 0.3 mm and less than 0.8 mm.

Figure 7:
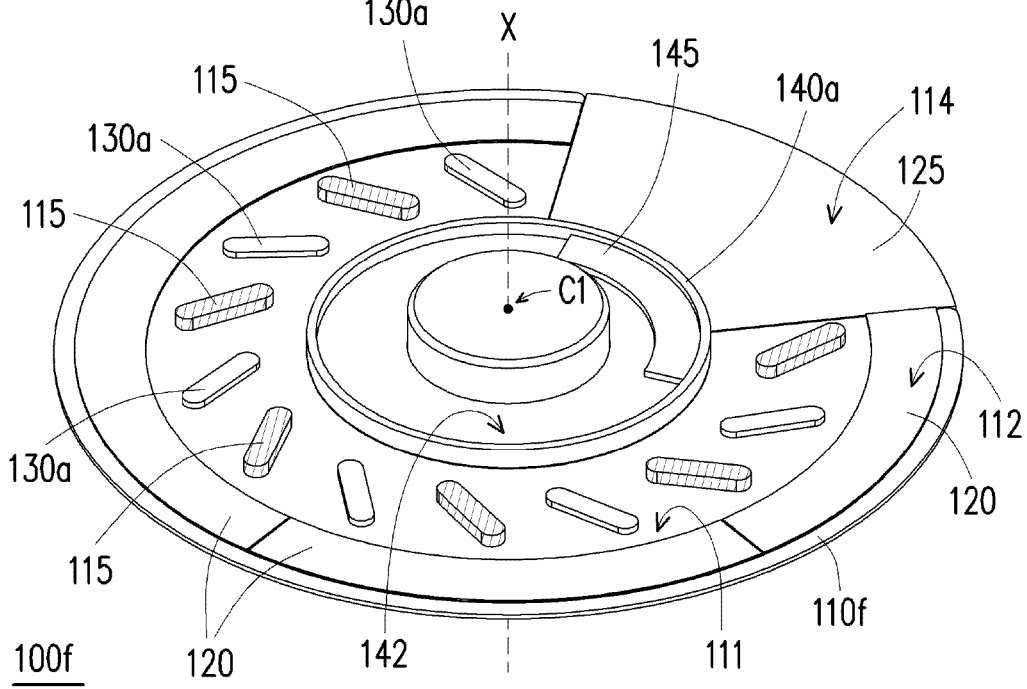
FIG. 7 is a perspective schematic diagram of a wavelength conversion module according to another embodiment of the disclosure.

FIG. 7 is a perspective schematic diagram of a wavelength conversion module according to another embodiment of the disclosure. A wavelength conversion module 100f of this embodiment is similar to the wavelength conversion module 100a of FIG. 2A. The difference between the two is that: in this embodiment, a substrate 110f has the first surface 111 and the second surface 113 opposite to each other and includes multiple spoiler parts 115. The spoiler parts 115 protrude inwardly from at least one of the first surface 111 and the second surface 113. In this embodiment, the spoiler parts 115 protrude inwardly from the first surface 111 and are staggered with the adhesive bosses 130a. Here, the spoiler parts 115 are formed by stamping or processing forming the substrate 110f. The material of the spoiler parts 115 is the same as the material of the substrate 110f. The height difference between the spoiler parts 115 and the first surface 111 of the substrate 110f is greater than the first height difference H11 between the adhesive bosses 130a and the first surface 111 of the substrate 110f (please refer to FIG. 2C).

In summary, the embodiments of the disclosure have at least one of the following advantages or effects. In the design of the wavelength conversion module of the disclosure, the adhesive bosses are separately configured on the substrate, and the adhesive bosses are configured without contacting the inner side of the wavelength conversion layer. With the design of the adhesive bosses, the heat dissipation effect of the substrate may be increased when the wavelength conversion module rotates at a high speed to reduce the temperature of the wavelength conversion layer, thereby increasing the excitation efficiency of the wavelength conversion module. Furthermore, the adhesive bosses also have the functions of increasing the toughness and strength of the substrate while balancing weight. In addition, the projector adopting the wavelength conversion module of the disclosure may have better projection quality and product competitiveness.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A wavelength conversion module, comprising a substrate, a wavelength conversion layer, a plurality of adhesive bosses, and a driving component, wherein:

the substrate has a first surface and a second surface opposite to the first surface;

the wavelength conversion layer is configured on the first surface of the substrate;

the plurality of adhesive bosses are separately disposed on the substrate, wherein the plurality of adhesive bosses comprise a plurality of first adhesive bosses and a plurality of second adhesive bosses;

the driving component is connected to the substrate to drive the substrate to rotate with an axis of the driving component as an axis center, the driving component and the plurality of second adhesive bosses are configured on the second surface, and the plurality of second adhesive bosses surround the driving component; and the plurality of first adhesive bosses are disposed on the first surface of the substrate and are contacted with the first surface without being through through holes receptively, and the plurality of second adhesive bosses are disposed on the second surface of the substrate and are contacted with the second surface without being through through holes receptively, the wavelength conversion layer surrounds the plurality of first adhesive bosses, and each of the plurality of first adhesive bosses is configured not to contact the wavelength of conversion layer, wherein each of the plurality of first adhesive bosses is radially disposed closer to the axis than each of the plurality of second adhesive bosses, wherein there is a first height difference between each of the plurality of first adhesive bosses and the first surface of the substrate, there is a second height difference between the wavelength conversion layer and the first surface of the substrate, and the first height difference is greater than the second height difference.

2. The wavelength conversion module according to claim 1, wherein the first height difference is greater than 0.3 mm and less than 0.8 mm.

3. The wavelength conversion module according to claim 1, wherein a thermal conductivity of each of the plurality of adhesive bosses is greater than 10 W/m·K.

4. The wavelength conversion module according to claim 1, wherein the material of the substrate comprises aluminum, aluminum oxide, aluminum nitride, silicon carbide, ceramic, ceramic and metal composite material, plastic and ceramic composite material, or plastic and metal composite material.

5. A wavelength conversion module, comprising a substrate, a wavelength conversion layer, a plurality of adhesive bosses, a driving component, a weight ring and an eccentric cover slab, wherein:

the substrate has a first surface and a second surface opposite to the first surface;

the wavelength conversion layer is configured on the first surface of the substrate;

the plurality of adhesive bosses are separately disposed on the substrate, wherein the wavelength conversion layer surrounds the plurality of adhesive bosses, and each of the plurality of adhesive bosses is configured separately from the wavelength of conversion layer, wherein the plurality of adhesive bosses comprise a plurality of first adhesive bosses and a plurality of second adhesive bosses;

the driving component is connected to the substrate to drive the substrate to rotate with an axis of the driving component as an axis center, the driving component and the plurality of second adhesive bosses are configured on the second surface, and the plurality of second adhesive bosses surround the driving component; and the weight ring is attached to the substrate along the axis, the plurality of first adhesive bosses are disposed on the first surface and are contacted with the first surface without being through through holes receptively, and the plurality of second adhesive bosses are disposed on the second surface and are contacted with the second surface without being through through holes receptively, wherein the eccentric cover slab is configured on the first surface of the substrate, a center of mass of the eccentric cover slab deviates from the axis center, the weight ring is configured on the second surface of the substrate, the weight ring is located between the driving component and the substrate, and the plurality of first adhesive bosses are located between the eccentric cover slab and the wavelength conversion layer.

6. The wavelength conversion module according to claim 5, further comprising:

a connecting glue layer, configured on a part of the second surface along a circumferential direction of the substrate, the plurality of second adhesive bosses are connected to each other through the connecting glue layer, there is a first height difference between each of the plurality of first adhesive bosses and the first surface of the substrate, there is a fourth height difference between the connecting glue layer and the second surface of the substrate, and the first height difference is greater than the fourth height difference.

7. The wavelength conversion module according to claim 5, wherein a shape of the plurality of adhesive bosses comprises a strip shape, each of the plurality of adhesive bosses has a first end and a second end opposite to each other, and a connecting line between the first end and the axis center and a connecting line between the second end and the axis center form an included angle.

8. A wavelength conversion module, comprising a substrate, a wavelength conversion layer, and a plurality of adhesive bosses, wherein:

the substrate has a first surface, a second surface opposite to the first surface and comprises a plurality of spoiler parts, wherein the substrate is configured to rotate with an axis, and the plurality of spoiler parts protrude axially from at least one of the first surface and the second surface;

the wavelength conversion layer is configured on the first surface of the substrate; and the plurality of adhesive bosses are separately disposed on the first surface of the substrate and are contacted with the first surface without being through through holes receptively, wherein the wavelength conversion layer surrounds the plurality of adhesive bosses, and each of the plurality of adhesive bosses is configured not to contact the wavelength of conversion layer, wherein the plurality of spoiler parts are staggered with the plurality of adhesive bosses along a circumferential direction.

9. A projector, comprising an illumination module, a light valve, and a projection lens, wherein:

the illumination module is configured to provide an illumination beam, and the illumination module comprises a light source and a wavelength conversion module, wherein:

the light source is configured to provide an excitation beam; and the wavelength conversion module is configured on a transmission path of the excitation beam and is configured to convert the excitation beam into a conversion beam, the illumination beam comprises the conversion beam, and the wavelength conversion module comprises a substrate, a wavelength conversion layer, a plurality of adhesive bosses, a driving component and a weight ring, wherein:

the substrate has a first surface and a second surface opposite to the first surface;

the wavelength conversion layer is configured on the first surface of the substrate; and the plurality of adhesive bosses are separately disposed on the substrate, wherein the plurality of adhesive bosses comprise a plurality of first adhesive bosses and a plurality of second adhesive bosses;

the driving component is connected to the substrate to drive the substrate to rotate with an axis of the driving component as an axis center, the driving component and the plurality of second adhesive bosses are configured on the second surface, and the plurality of second adhesive bosses surround the driving component; and the weight ring is attached to the substrate along the axis, wherein the plurality of first adhesive bosses are disposed on the first surface and are contacted with the first surface without being through through holes receptively, and the plurality of second adhesive bosses are disposed on the second surface of the substrate and are contacted with the second surface without being through through holes receptively, and the wavelength conversion layer surrounds the plurality of first adhesive bosses, and each of the plurality of first adhesive bosses is configured separately from the wavelength conversion layer;

wherein each of the plurality of first adhesive bosses is radially disposed closer to the axis than each of the plurality of second adhesive bosses;

the light valve is configured on a transmission path of the illumination beam and is configured to convert the illumination beam into an image beam; and the projection lens is configured on a transmission path of the image beam and is configured to project the image beam out of the projector.

\* \* \* \* \*